Patented Oct. 20, 1953

2,656,323

UNITED STATES PATENT OFFICE 2,656,323

MANUFACTURE OF PHOSPHORIC ACID-GROUP IV METAL OXIDE CONTAINING CATALYST

Mitchell S. Bielawski, Berwyn, and Julian M. Mavity, Hinsdale, Ill., assignors to Universal Oil Products Company, Chicago, Ill., a corporation of Delaware No Drawing. Application April 12, 1949, Serial No. 87,133

9 Claims. (Cl. 252—435)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and a member of the group consisting of an oxide, a hydroxide, and a salt of a metal selected from the members of the left hand column of group IV of the periodic table, drying and calcining the resultant mixture.

Another embodiment of this invention relates to a process for manufacturing a solid catalyst which comprises mixing a phosphoric acid, a siliceous adsorbent, and titanium oxide, drying and calcining the resultant mixture.

A further embodiment of this invention relates to a process for manufacturing a solid catalyst which comprises mixing a phosphoric acid, a siliceous adsorbent, and zirconium oxide, drying and calcining the resultant mixture.

A still further embodiment of this invention relates to a process for manufacturing a solid catalyst which comprises mixing a phosphoric acid, a siliceous adsorbent, and thorium oxide, drying and calcining the resultant mixture.

An additional embodiment of this invention relates to a process for manufacturing a solid catalyst which comprises mixing a polyphosphoric acid, diatomaceous earth, and a member of the group consisting of an oxide, a hydroxide, and a salt of a metal selected from the members of the left hand column of group IV of the periodic table to form a composite, drying and calcining said composite.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, ortho-phosphoric acid ($H_3PO_4$) and pyro-phosphoric acid ($H_4P_2O_7$) find general application in the primary mixtures, due mainly to their cheapness and to the readiness with which they may be procured, although the invention is not restricted to their use but may employ any of the other acids of phosphorus insofar as they are adaptable. It is not intended to infer, however, that the different acids of phosphorus, which may be employed will produce catalysts which have identical effects upon any given organic reactions as each of the catalysts produced from different acids and by slightly varied procedure will exert its own characteristic action.

In using ortho-phosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the ortho-phosphoric acid. Within these concentration ranges, the acids will be liquids of varying viscosities, and readily mixed with adsorbent materials. In practice it has been found that pyro-phosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that used when the ortho acid is so employed.

Trisphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing ortho-phosphoric, pyro-phosphoric, tri-phosphoric, and other poly-phosphoric acids.

Another acid of phosphorus which may be employed in the manufacture of composite catalysts according to the present invention is tetra-phosphoric acid. It has the general formula $H_6P_4O_{13}$ which corresponds to the double oxide formula $3H_2O.2P_2O_5$ which in turn may be considered as the acid resulting when three molecules of water are lost by four molecules of ortho-phosphoric acid $H_3PO_4$. The tetra-phosphoric acid may be manufactured by the gradual and controlled dehydration by heating of ortho-phosphoric acid or pyro-phosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperature, the crystals of the tetra-phosphoric acid separate from the viscous liquid and it is found that these crystals melt at approximately 93° F. and have a specific gravity of 1.1886 at a temperature of 60° F. However, it is unnecessary to crystallize the tetra-phosphoric acid before employing it in the preparation of the solid catalyst inasmuch as the crude tetra-phosphoric acid mixture may be incorporated with the siliceous adsorbent and other catalyst ingredient.

The materials which may be employed as adsorbents or carriers for acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

Catalysts may be prepared from an acid of phosphorus such as ortho-phosphoric acid or a polyphosphoric acid including pyrophosphoric acid, triphosphoric acid, or tetraphosphoric acid, and a siliceous adsorbent containing a compound selected from the members of the group consisting of an oxide, a hydroxide, and a salt of a metal selected from the members of the left hand column of group IV of the periodic table. A salt which is so used in the preparation of our composite catalysts includes particularly a carbonate, a sulfide, and a halide such as a chloride or bromide. These mentioned starting materials used in this catalyst preparation process are subjected to the steps of mixing the group IV metal compound with the siliceous adsorbent, and thereafter mixing the phosphoric acid with the mixture of finely divided siliceous adsorbent and oxide, hydroxide or salt. The mixing with the phosphoric acid is generally carried out at a temperature of from about 50° to about 450° F. to form a rather wet paste, particularly since the phosphoric acid is ordinarily the major constituent used in forming the composite. Also the group IV metal compound may be added first to the phosphoric acid or the different catalyst ingredients may be mixed in any order to form a composite.

The resultant wet paste which is so formed from the phosphoric acid, siliceous adsorbent, and group IV metal compound is then formed into shaped particles by extrusion or other suitable means and the resultant particles are then dried at a temperature of from about 200° to about 500° F. to form a substantially solid material which is then calcined further at a temperature generally of from about 500° to about 1000° F. for a time of from about 0.25 to about 10 hours. The calcining may be carried out by heating in a substantially inert gas, such as air, nitrogen, and the like.

The resultant catalyst which has been calcined is active for polymerizing olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth is preferably employed as a granular layer in a heated reactor, which is generally made from steel, and through which the preheated olefin-containing hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin containing gas mixture is passed downwardly therethrough at a temperature of from about 350° to about 550° F. and at a pressure of from about 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalyst of this invention for promoting miscellaneous organic reactions, the catalyst may be employed in essentially the same way as it is used when polymerizing olefins in case the reactions are essentially vapor phase, and it may be employed in suspension in liquid phase in various types of equipment.

With suitable modifications in the details of operation, the present type of catalyst may be employed in a large number of organic reactions, including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc. Reactions involving the hydro-halogenation of unsaturated organic compounds, isomerization reactions, ester formation by the interaction of carboxylic acids, and olefins, and the like. The specific procedure for utilizing the present type of catalyst in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst, an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use.

As an important feature of this invention, we have found, however, that catalysts of good crushing strength may be produced by adding to the composite of phosphoric acid and diatomaceous earth, a relatively small amount of a member of the group of compounds consisting of an oxide, a hydroxide, and a salt of a metal selected from the members of the left hand column of group IV of the periodic table, which is generally added in an amount of not more than 10% and preferably from about 0.5 to about 5% by weight of the catalyst mixture. A catalyst formed by drying and calcining such a composite containing a group IV metal compound also has a good crushing strength after it has been used in the polymerization of normally gaseous olefins to form normally liquid olefins. Pyrophosphoric acid-diatomaceous earth mixtures to which at least one of the above indicated compounds has been added and then the resultant composite has been dried and calcined, have been found to produce catalysts having a high resistance to crushing during use. This resistance to crushing during use is indicated by a high crushing strength both before and after use in polymerizing olefinic hydrocarbons. Such catalysts are tested for example by contacting a propane-propylene fraction therewith in a rotatable steel autoclave maintained at a temperature of about 450° F. for a time of about 2 hours. During such a test from about 30 to about 65% of the propylene charged is converted into normally liquid polymers.

The following examples of the preparation of catalysts comprised within the scope of this invention and the results obtained in their use for catalyzing the polymerization of propylene are characteristic, although the exact details set forth in these examples are not to be construed as imposing undue limitations upon the generally broad scope of the invention.

Table I shows comparative results obtained in autoclave tests on phosphoric acid-diatomaceous earth catalysts containing a member of the group consisting of an oxide, a hydroxide, and a salt of a metal selected from the members of the left hand column of group IV of the periodic table. These catalyst activity tests were carried out by placing 10 grams of 5 x 5 mm. pellets of the catalyst and 100 grams of propane-propylene mixture (50–55% propylene content) in a rotatable steel autoclave of 850 cc. capacity rotated at a temperature of 450° F. for two hours. At the end of this time, determinations were made to indicate the percentage conversion of propylene into liquid polymers.

TABLE I

*Olefin polymerization activity and crushing strength results obtained on catalysts prepared from phosphoric acid, diatomaceous earth and oxides of titanium, zirconium, and thorium*

[Test Conditions: 10 grams catalyst, 100 grams propane-propylene feed (50–55 mole percent $C_3H_6$) two hours at 450° F. (232° C.) in 850 cc. rotating autoclave.]

| Run No. | Material added to mixture of pyrophosphoric acid and diatomaceous earth | Calcination | | Percent Conv. of $C_3H_6$ | Crushing strength, lbs. | |
|---|---|---|---|---|---|---|
| | | ° F. | Hrs. | | Before use | After use |
| 1 | None | Commercial | | 66 | 11.4 | 5.4 |
| 2 | ----do---- | 860 | 1 | 48 | 16.0 | 9.1 |
| 3 | 1.8% Titanium dioxide | 500 | 1 | 29 | 25.8+ | 19.9 |
| 4 | ----do---- | 860 | 1 | 64 | 21.1+ | 12.0 |
| 5 | ----do---- | 950 | 1 | 44 | 20.2 | 21.1 |
| 6 | 4.6% Zirconium dioxide | 500 | 1 | 22 | 19.4 | 19.2 |
| 7 | ----do---- | 860 | 1 | 56 | 21.4 | 15.7 |
| 8 | 3.7% Thorium dioxide | 500 | 1 | 4 | 21.0 | 19.0 |

As indicated in the above table, a commercial solid phosphoric acid catalyst prepared from diatomaceous earth and pyrophosphoric acid but containing no additional compound had a propylene polymerizing activity of 66% in the autoclave test but showed an after use crushing strength of only 5.4 pounds in comparison with a before use crushing strength of 11.4 pounds. Similarly a diatomaceous earth phosphoric acid catalyst which had been given an additional calcination treatment for one hour at a temperature of 860° F. gave a propylene conversion of 48% and retained an after use crushing strength of 9.4 pounds which was considerably lower than the initial crushing strength of 16 pounds.

The addition of 1.8% by weight of titanium dioxide to a diatomaceous earth-pyrophosphoric acid mixture yielded a composite which after drying and calcination as indicated in Table I had a propylene polymerizing activity of between 29 and 64%, an initial crushing strength of 20 to 26 pounds and an after use crushing strength of 12 to 21 pounds. It is thus noted that the addition of this relatively small amount of titanium dioxide improved considerably the crushing strength of the resultant catalyst composite over that of the pyrophosphoric acid-diatomaceous earth catalyst.

Similarly, the addition of 4.6% of zirconium dioxide produced finished catalysts with propylene conversion activities of 22 to 56%, initial crushing strengths of 19–21 pounds and after use crushing strengths of 16 to 19 pounds.

The catalyst used in run 8 was produced by adding 3.7% of thorium dioxide to the pyrophosphoric acid-diatomaceous earth mixture and then calcining at a temperature of 500° F. for one hour. This catalyst had a rather low activity, 4% of propylene conversion, but had an after use crushing strength of 19 pounds in comparison with an initial crushing strength of 21 pounds.

Further details concerning the preparation of the catalyst composites tested in runs 3 to 8 inclusive are as follows:

For producing catalysts used in runs 3 to 5, an intimate mixture of 43.8 grams of diatomaceous earth and 3.5 grams of titanium dioxide was mixed into a paste with 177.4 grams of orthophosphoric acid of 85% $H_3PO_4$ concentration. The paste-like material was then heated in an evaporating dish on a water bath under a heat lamp until the consistency of the pasty material was suitable for pressing it into a pill mold which consisted of a steel sheet of 5 mm. thickness containing 100 drill holes of 5 mm. internal diameter. The mold plate filled with the catalyst material was then dried in an oven for 30 minutes at a temperature of 392° F., the pills were pressed from the plate and dried for an additional 30 minutes at the same temperature, and then dried further for 2 hours at 500° F. in a muffle furnace. The composition of the resultant catalyst mixture was calculated as 22.1% diatomaceous earth, 76.1% of orthophosphoric acid and 1.8% of titanium dioxide.

The catalytic material used in runs 6 and 7 was prepared from 43.9 grams of diatomaceous earth, 9.7 grams of zirconium dioxide, and 84.3 grams of orthophosphoric acid containing 85% $H_3PO_4$. In this preparation mentioned, the two solids were intimately mixed and the phosphoric acid was then added with further mixing. The mixture was heated in an open vessel to give a paste suitable for filling into the aforementioned pill plate. The resulting pills or pellets were punched from the pill plate after a preliminary drying at a temperature of 392° F. for 30 minutes, then were dried at the same temperature for 30 minutes more and calcined for one hour at a temperature of 500° F. to yield dry catalyst pellets with an average bulk density of 0.84 and an average crushing strength of 19.4 pounds. The composition calculated upon the basis of the starting materials was 20.8% diatomaceous earth, 74.5% of orthophosphoric acid and 4.6% of zirconium dioxide. As indicated in Table I, the catalyst used in run 7 corresponded to that used in run 6 after receiving an additional calcination treatment for one hour at a temperature of 860° F.

The catalyst of run 8 was prepared from 43.8 grams of diatomaceous earth, 7.4 grams of thorium dioxide and 176.1 grams of orthophosphoric acid, of 85% $H_3PO_4$ concentration. Following the same procedure used in preparing the above indicated catalysts containing zirconium, the resultant catalyst in the form of 5 x 5 mm. pellets was given a calcination for one hour at a temperature of 500° F. after which the catalyst pellets had an average bulk density of 0.86 and an average crushing strength of 21 pounds. The calculated composition of this catalyst is 21.8% of diatomaceous earth, 74.5% of orthophosphoric acid, and 3.7% of thorium dioxide.

We claim as our invention:

1. A process for manufacturing a solid catalyst which comprises mixing at least 50% by weight of a phosphoric acid, an uncalcined siliceous adsorbent, and not over approximately 10% by weight of a member of the group of compounds consisting of an oxide, a hydroxide, and a salt of a metal of the left hand column of group IV of the periodic table, pelleting the resultant mixture, and calcining the pellets at a temperature of from about 500° to about 1000° F.

2. A process for manufacturing a solid catalyst which comprises mixing at least 50% by weight of a phosphoric acid, an uncalcined siliceous adsorbent, and not over approximately 10% by weight of titanium oxide, pelleting the resultant mixture, and calcining the pellets at a temperature of from about 500° to about 1000° F.

3. A process for manufacturing a solid catalyst which comprises mixing at least 50% by weight of a phosphoric acid, an uncalcined siliceous adsorbent, and not over approximately 10% by weight of zirconium oxide, pelleting the resultant mixture, and calcining the pellets at a temperature of from about 500° to about 1000° F.

4. A process for manufacturing a solid catalyst which comprises mixing at least 50% by weight of a phosphoric acid, an uncalcined siliceous adsorbent, and not over approximately 10% by weight of thorium oxide, pelleting the resultant mixture, and calcining the pellets at a temperature of from about 500° to about 1000° F.

5. A process for manufacturing a solid catalyst which comprises mixing at least 50% by weight of a polyphosphoric acid, uncalcined diatomaceous earth, and not over approximately 10% by weight of a member of the group consisting of an oxide, a hydroxide, and a salt of a metal of the left hand column of group IV of the periodic table to form a composite, pelleting said composite, and calcining the pellets at a temperature of from about 500° to about 1000° F.

6. A process for manufacturing a solid catalyst which comprises mixing from about 50 to about 75% by weight of a phosphoric acid, from about 15 to about 49.5% by weight of an uncalcined siliceous adsorbent, and from about 0.5 to about 10% by weight of a member of the group of compounds consisting of an oxide, a hydroxide, and a salt of a metal of the left hand column of group IV of the periodic table to form a composite, pelleting said composite, and calcining the pellets at a temperature of from about 500° to about 1000° F.

7. A process for manufacturing a solid catalyst which comprises mixing from about 50 to about 75% by weight of a phosphoric acid, from about 15 to about 49.5% by weight of an uncalcined siliceous adsorbent, and from about 0.5 to about 10% by weight of titanium dioxide to form a composite, pelleting said composite, and calcining the pellets at a temperature of from about 500° to about 1000° F.

8. A process for manufacturing a solid catalyst which comprises pelleting a mixture of from about 50 to about 75% by weight of a phosphoric acid, from about 15 to about 49.5% by weight of an uncalcined siliceous adsorbent, and from about 0.5 to about 10% by weight of zirconium dioxide, and calcining the pellets at a temperature of from about 500° to about 1000° F.

9. A process for manufacturing a solid catalyst which comprises pelleting a mixture of from about 50 to about 75% by weight of a phosphoric acid, from about 15 to about 49.5% by weight of an uncalcined siliceous adsorbent, and from 0.5 to about 10% by weight of thorium dioxide, and calcining the pellets at a temperature of from about 500° to about 1000° F.

MITCHELL S. BIELAWSKI.
JULIAN M. MAVITY.

References Cited in the file of this patent

UNITED STATES PATENTS

| Number | Name | Date |
|---|---|---|
| 2,120,702 | Ipatieff et al. | June 14, 1938 |
| 2,120,723 | Watson | June 14, 1938 |
| 2,231,452 | Morrell | Feb. 11, 1941 |
| 2,275,182 | Ipatieff et al. | Mar. 3, 1942 |
| 2,289,063 | Ocon et al. | July 7, 1942 |
| 2,300,123 | Keunecke et al. | Oct. 27, 1942 |
| 2,425,493 | Stapleton | Aug. 12, 1943 |
| 2,446,619 | Stewart et al. | Aug. 10, 1948 |
| 2,447,599 | Schmerling | Aug. 24, 1948 |
| 2,496,621 | Deery | Feb. 7, 1950 |
| 2,525,144 | Mavity | Oct. 10, 1950 |
| 2,569,092 | Deering | Sept. 25, 1951 |